United States Patent
Kinter

(10) Patent No.: US 8,131,941 B2
(45) Date of Patent: Mar. 6, 2012

(54) SUPPORT FOR MULTIPLE COHERENCE DOMAINS

(75) Inventor: Ryan C. Kinter, Seattle, WA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 588 days.

(21) Appl. No.: 11/859,198

(22) Filed: Sep. 21, 2007

(65) Prior Publication Data

US 2009/0083493 A1    Mar. 26, 2009

(51) Int. Cl.
*G06F 12/08* (2006.01)

(52) U.S. Cl. ......... 711/141; 711/147; 711/151; 711/152

(58) Field of Classification Search .................. 711/141, 711/147, 151, 152
See application file for complete search history.

(56) References Cited

U.S. PATENT DOCUMENTS

| | | | |
|---|---|---|---|
| 5,406,504 | A | 4/1995 | Denisco et al. |
| 5,530,933 | A | 6/1996 | Frink et al. |
| 5,715,428 | A * | 2/1998 | Wang et al. ................. 711/141 |
| 5,889,779 | A | 3/1999 | Lincoln |
| 6,073,217 | A | 6/2000 | Mahakingaiah et al. |
| 6,088,771 | A | 7/2000 | Steely, Jr. et al. |
| 6,202,127 | B1 | 3/2001 | Dean et al. |
| 6,216,200 | B1 | 4/2001 | Yeager |
| 6,266,755 | B1 | 7/2001 | Yeager |
| 6,393,500 | B1 | 5/2002 | Thekkath |
| 6,418,517 | B1 | 7/2002 | McKenney et al. |
| 6,490,642 | B1 | 12/2002 | Thekkath et al. |
| 6,493,776 | B1 | 12/2002 | Courtright et al. |
| 6,507,862 | B1 | 1/2003 | Joy et al. |
| 6,594,728 | B1 | 7/2003 | Yeager |
| 6,604,159 | B1 | 8/2003 | Thekkath et al. |
| 6,651,156 | B1 | 11/2003 | Courtright et al. |
| 6,681,283 | B1 | 1/2004 | Thekkath et al. |
| 6,721,813 | B2 | 4/2004 | Owen et al. |
| 6,732,208 | B1 | 5/2004 | Alsaadi et al. |

(Continued)

FOREIGN PATENT DOCUMENTS

WO       WO 95/30954 A1    11/1995

OTHER PUBLICATIONS

U.S. Appl. No. 10/783,960, filed Feb. 20, 2004, Petersen et al.

(Continued)

*Primary Examiner* — Yong Choe
(74) *Attorney, Agent, or Firm* — Kilpatrick Townsend & Stockton LLP; Ardeshir Tabibi

(57) ABSTRACT

A number of coherence domains are maintained among the multitude of processing cores disposed in a microprocessor. A cache coherency manager defines the coherency relationships such that coherence traffic flows only among the processing cores that are defined as having a coherency relationship. The data defining the coherency relationships between the processing cores is optionally stored in a programmable register. For each source of a coherent request, the processing core targets of the request are identified in the programmable register. In response to a coherent request, an intervention message is forwarded only to the cores that are defined to be in the same coherence domain as the requesting core. If a cache hit occurs in response to a coherent read request and the coherence state of the cache line resulting in the hit satisfies a condition, the requested data is made available to the requesting core from that cache line.

25 Claims, 9 Drawing Sheets

U.S. PATENT DOCUMENTS

| | | |
|---|---|---|
| 6,976,155 B2 | 12/2005 | Drysdale et al. |
| 7,003,630 B1 | 2/2006 | Kissell |
| 7,017,025 B1 | 3/2006 | Kissell |
| 7,047,372 B2 | 5/2006 | Zeitler et al. |
| 7,107,567 B1 | 9/2006 | LeBlanc |
| 7,162,590 B2 | 1/2007 | Pruvos et al. |
| 7,162,615 B1 | 1/2007 | Gelinas et al. |
| 7,240,165 B2 | 7/2007 | Tierney et al. |
| 7,257,814 B1 | 8/2007 | Melvin et al. |
| 7,353,340 B2 | 4/2008 | Hetherington et al. |
| 7,577,822 B2 | 8/2009 | Vorbach |
| 7,739,476 B2 | 6/2010 | Pan et al. |
| 2002/0129029 A1 | 9/2002 | Warner et al. |
| 2004/0019891 A1 | 1/2004 | Koenen |
| 2004/0249880 A1 | 12/2004 | Vorbach |
| 2006/0179429 A1 | 8/2006 | Eggers et al. |
| 2007/0043911 A1 | 2/2007 | Hetherington et al. |
| 2007/0043913 A1 | 2/2007 | Hetherington et al. |
| 2007/0113053 A1 | 5/2007 | Jensen et al. |
| 2009/0089510 A1 | 4/2009 | Lee et al. |
| 2009/0157981 A1 | 6/2009 | Kinter et al. |
| 2009/0248988 A1 | 10/2009 | Berg et al. |
| 2009/0276578 A1 | 11/2009 | Moyer |
| 2010/0287342 A1 | 11/2010 | Greenberg et al. |

OTHER PUBLICATIONS

PCT International Search Report of the International Searching Authority for Application No. PCT/US2008/77084, Dated Dec. 15, 2008.

PCT Written Opinion of the International Searching Authority for Application No. PCT/US2008/77084, Dated Dec. 15, 2008.

Non Final Office Action for U.S. Appl. No. 11/864,363, mailed on Jun. 10, 2010, 8 pages.

Final Office Action for U.S. Appl. No. 11/864,363, mailed on Feb. 17, 2011, 9 pages.

Non Final Office Action for U.S. Appl. No. 12/332,291, mailed on Mar. 31, 2011, 19 pages.

Final Office Action for U.S. Appl. No. 12/332,291, mailed on Nov. 19, 2011, 22 pages.

"CPU cache," from Wikipedia, retrieved from the internet on Nov. 10, 2007 at http://en.wikipedia.org/wiki/CPU_cache, pp. 1-16.

"Self-modifying code," from Wikipedia, retrieved from the Internet on Nov. 10, 2007 at http://en.wikipedia.org/wiki/Self-modifying_code, pp. 1-5.

Drepper, Ulrich, "Memory part 2: CPU caches," retrieved from the internet on Nov. 10, 2007 at http://lwn.net/Articles 252125/, pp. 1-53.

Genua, P., "A cache primer," Freescale Semiconductor AN2663, Rev. 1, Oct. 2004, pp. 1-16.

McKenney, Paul E., "Memory ordering in modern microprocessors, Part II," created Jul. 28, 2005, retrieved from the internet on Jan. 3, 2008 at http://linuxjournal.com/print/8212, pp. 1-8.

MIPS32® 34K® Processor Core Family Software User's Manual, MIPS Technologies, Document Number: MD00534, Revision 01.02, Dec. 19, 2006, 375 pages.

Non Final Office Action for U.S. Appl. No. 12/058,117, mailed on Sep. 2, 2010, 25 pages.

Non Final Office Action for U.S. Appl. No. 12/058,117, mailed on May 10, 2011, 8 pages.

International Search Report and Written Opinion for Application No. PCT/US2009/038261, mailed on Jul. 1, 2009, 12 pages.

* cited by examiner

| Entry No. | Index | Value |
|---|---|---|
| 1 | 000 | 001111 |
| 2 | 001 | 000011 |
| 3 | 010 | 000101 |
| 4 | 011 | 001101 |
| 5 | 100 | 001111 |
| 6 | 101 | 000101 |

SUPPORT FOR MULTIPLE COHERENCE DOMAINS

BACKGROUND OF THE INVENTION

The present invention relates to multiprocessor systems, and more particularly to maintaining a multitude of independent coherence domains in a multiprocessor system.

Advances in semiconductor fabrication technology have given rise to considerable increases in microprocessor clock speeds. Although the same advances have also resulted in improvements in memory density and access times, the disparity between microprocessor clock speeds and memory access times continues to persist. To reduce latency, often one or more levels of high-speed cache memory are used to hold a subset of the data or instructions that are stored in the main memory. A number of techniques have been developed to increase the likelihood that the data/instructions held in the cache are repeatedly used by the microprocessor.

To improve performance at any given operating frequency, microprocessors with a multitude of processing cores that execute instructions in parallel have been developed. The processing cores (hereinafter alternatively referred to as cores) may be integrated within the same semiconductor die, or may be formed on different semiconductor dies coupled to one another within a package, or a combination the two. Each core typically includes its own level-1 cache and an optional level-2 cache.

A cache coherency protocol governs the traffic flow between the memory and the caches associated with the cores to ensure coherency between them. For example, the cache coherency protocol ensures that if a copy of a data item is modified in one of the caches, copies of the same data item stored in other caches and in the main memory are updated or invalidated in accordance with the modification.

FIG. 1 is a block diagram of a microprocessor 20 (hereinafter alternatively referred to a processor) having four independent cores $10_1$, $10_2$, $10_3$ and $10_4$, as known in the prior art. Each core $10_i$ is shown as including a level-1 (L1) cache $15_i$, where i is an integer varying from 1 to 4. Assume that a data requested by core $10_1$ is not present in its L1 cache $15_1$. To gain access to this data, core $10_1$ issues a read request. Arbiter 25 receives and serializes all such read requests and transfers one of the serialized requests to cores $10_1$, $10_2$, $10_3$ and $10_4$ during each clock cycle. If the data associated with the read request made by core $10_1$ is detected as being present in any of the L1 caches, the requested data is transferred to cache $15_1$ from the L1 cache in which the data resides. If none of the L1 caches contain the request data, a copy of this data is retrieved from main memory 35 via system bus 30 and subsequently stored in cache $15_1$.

As described above, a read request issued by arbiter 25 causes all caches to search for the requested data, thereby consuming power. Furthermore, since the response from all the cores must be received to determine if another cache contains the requested data, a core engaged in executing other instructions and unable to process the requested operation, slows down the process and adversely affects the time it would otherwise take to complete the read request.

As the number of cores in a microprocessor increases, the coherence traffic may become increasingly heavier thus resulting in even more power consumption and system bus bandwidth use. The problem is compounded when traffic requests from multiple I/O devices (I/Os) are also sent to the caches.

BRIEF SUMMARY OF THE INVENTION

In accordance with one embodiment of the present invention, a number of coherence domains are maintained among the multitude of processing cores disposed in a microprocessor. The microprocessor includes, in part, a cache coherency manager adapted to define a coherency relationship between each of the multitude of processing cores so that coherence traffic flows only between the processing cores that are defined as having a coherency relationship.

In one embodiment, the data defining the coherency relationships among the processing cores is stored in a programmable register. For each source of a coherent request, the processing core targets of the request are identified in the programmable register. In one embodiment, a processing core may be defined to be coherent with each of the other processing cores. In another embodiment, each core may be defined to be coherent with a subset of the processing cores.

In one embodiment, in response to a coherent request made by any one of the processing cores, an intervention message is forwarded to the requesting core, as well as to all the cores that are defined to be in the same coherence domain as the requesting core. If the request is a read request and the requested data is stored in a modified or exclusive state in the cache memory of any of the cores that receives the intervention message, the requested data is made available to the requesting core from that cache memory. If the requested data is not stored in a modified or exclusive state in the cache memory of any of the cores that receives the intervention message, the requested data is made available to the requesting core from the system memory, or from the optional level-2 cache or level-3 cache.

In one embodiment, the coherency manager includes an L1 cache tag array that is a duplicate of the aggregate L1 cache tags disposed in the processing cores. The duplicate cache tag array identifies the cores that receive the intervention messages and dispenses the need for having a dedicated duplicate cache tag associated with each core. In another embodiment, the coherency manager includes a directory configured to direct the intervention messages in conformity with the established coherence relationships. If the data identified by a coherent request is indicated by the directory as being present in a core, an intervention message is sent to that core. In another embodiment, the main system memory is logically partitioned in conformity with the multiple coherence relationship maintained by the cache coherency manager. Each coherence domain is thus mapped to and is associated with a range of addresses within the main memory.

The cache coherency manager is also adapted to maintain coherency between an input/output device and one or more of the processing cores disposed in the microprocessor. The input/output device may be coupled to the microprocessor via a bus.

In one embodiment, the microprocessor includes, in part, first, second, and third processing cores each including, in part, a core adapted to execute program instructions, a cache memory adapted to store data in cache lines; and a cache control logic. In one embodiment, the data stored in the programmable register may cause the first and second processing cores to be cache coherent, the first and third processing cores to be cache coherent, and the second and third processing cores to be cache non-coherent.

In accordance with another embodiment of the present invention, a method of controlling coherence traffic among a multitude of processing cores disposed in a microprocessor, includes, in part, enabling coherence traffic to flow among the processing cores that are defined as having a coherency relationship; and inhibiting coherence traffic flow among the processing cores that are defined as not having a coherency relationship.

In response to receiving a coherent request from any one of the cores, an intervention message is sent only to the processing cores that are defined as being coherent with the requesting core. In one embodiment, a processing core may be defined to be coherent with each of the other cores disposed in the microprocessor. In another embodiment, a processing core may be defined to be coherent with a subset of the processing cores disposed in the microprocessor.

In one embodiment, in response to a coherent request by any one of the processing cores, an intervention message is forwarded to the requesting core, as well as to all the cores that are defined to be in the same coherence domain as the requesting core. If the request is a read request and the requested data is stored in a modified or exclusive state in the cache memory of any of the cores that receives the intervention message, the requested data is made available to the requesting core. If the requested data is not stored in a modified or exclusive state in the cache memory of any of the cores that receives the intervention message, the requested data is made available to the requesting core from the system memory, or from the optional level-2 cache or level-3 cache. In one embodiment, the cache coherency manager is also adapted to maintain coherency between an input/output device and one or more of the processing cores disposed in the microprocessor. The input/output device may be coupled to the microprocessor via a system bus.

DETAILED DESCRIPTION OF THE INVENTION

In accordance with one embodiment of the present invention, a number of coherence domains is established among the multitude of processing cores disposed in a microprocessor. A cache coherency manager defines the coherency relationships such that coherence traffic flows only among the processing cores that are defined as having a coherency relationship. For example, when an application software is aware in advance of the partitioning of the workload across the different processing cores, the software configures the coherency manager such that only cores that share data are maintained in the same coherence domain.

In one embodiment, the data defining the coherency relationships between the processing cores is optionally stored in a programmable register. In another embodiment, this data is stored in a random access (RAM) memory disposed in the coherency manager. In yet other embodiments, hardwired circuitry may supply this data. Although the following description is, in part, provided with reference to a mask register, it is understood that any other storage location or hardwired circuitry may be used to define the coherency relationships.

Figure 1:
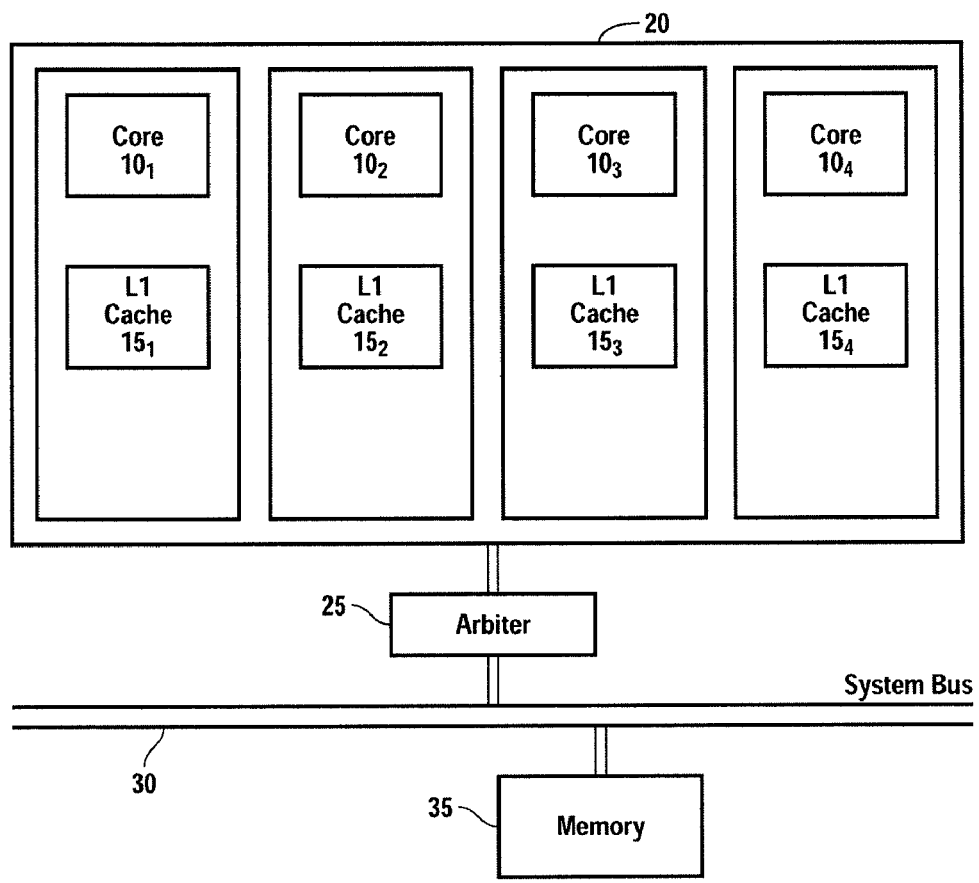
FIG. 1 is a block diagram of a multi-core microprocessor, as known in the prior art.
Figure 2B:
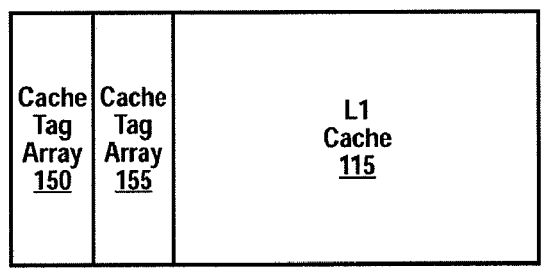
FIG. 2B shows a level-1 cache and its associated dual cache tag array disposed in one or more of the cores shown in FIG. 2A, in accordance with one exemplary embodiment of the present invention.
Figure 2C:
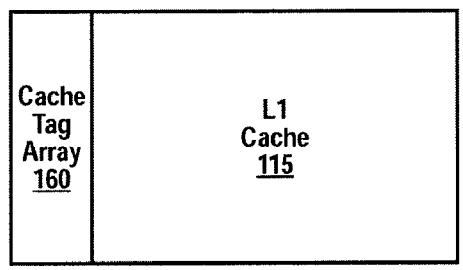
FIG. 2C shows a level-1 cache and its associated cache tag array disposed in one or more of the cores shown in FIG. 2A, in accordance with another exemplary embodiment of the present invention.
Figure 2A:
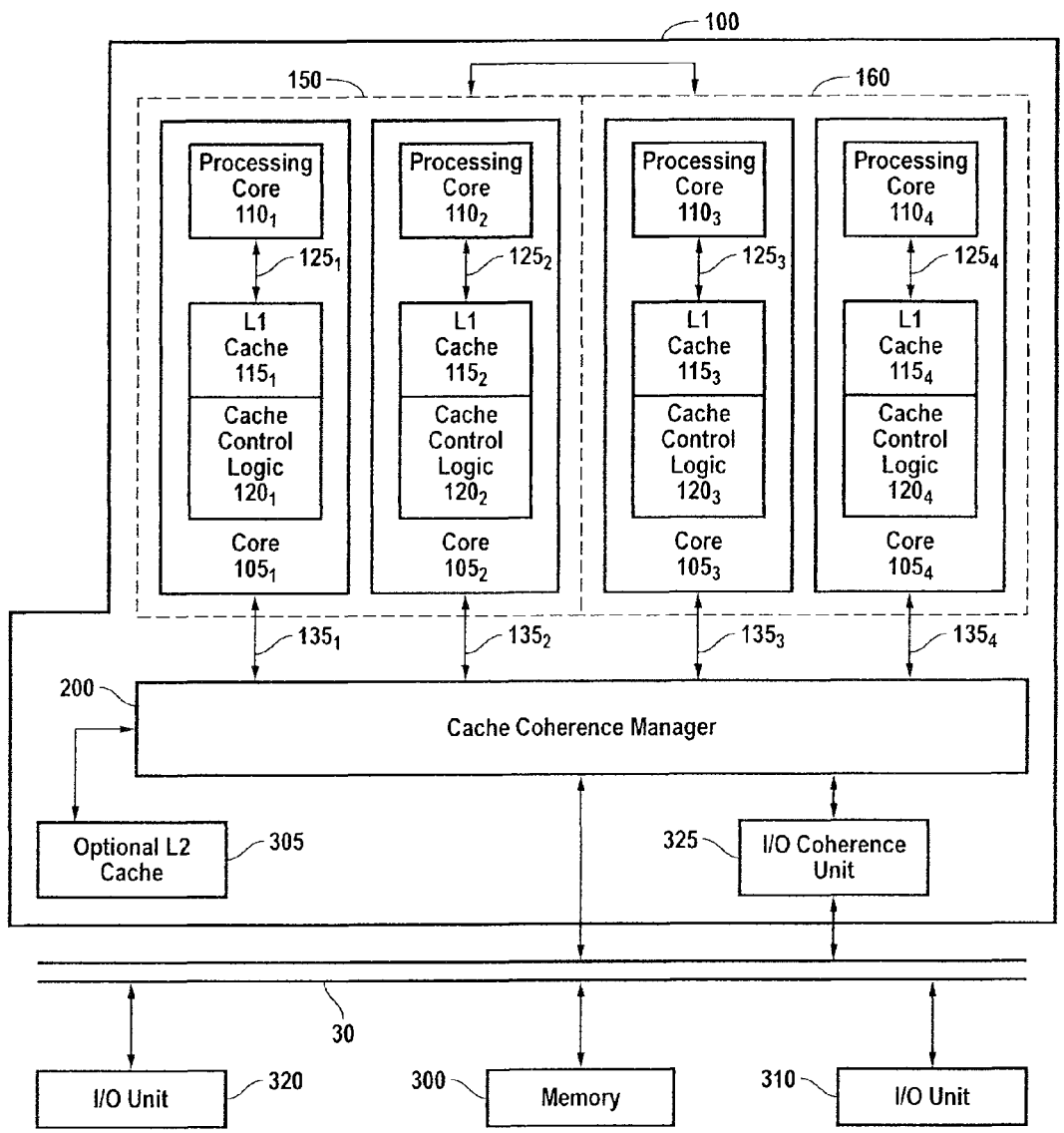
FIG. 2A shows a microprocessor, in communication with a number of I/O devices and a system memory, and having a multitude of cores that are selectively maintained coherent or non-coherent with one another, in accordance with one embodiment of the present invention.

FIG. 2A is a block diagram of a microprocessor 100, in accordance with one exemplary embodiment of the present invention, that is in communication with system memory 300 and I/O units 310, 320 via system bus 325. Microprocessor (hereinafter alternatively referred to as processor) 100 is shown as including, in part, four cores $105_1$, $105_2$, $105_3$ and $105_4$, a cache coherency manger 200, and an optional level-2 (L2) cache 305. Each core $105_i$, where i is an integer ranging from 1 to 4, is shown as including, in part, a processing core $110_i$, an L1 cache $115_i$, and a cache control logic $120_i$. Although exemplary embodiment of processor 100 is shown as including four cores, it is understood that other embodiments of processor 100 may include more or fewer than four cores.

Each processing core $110_i$ is adapted to perform a multitude of fixed or flexible sequence of operations in response to program instructions. Each processing core $110_i$ may conform to either CISC and/or RISC architectures to process scalar or vector data types using SISD or SIMD instructions. Each processing core $110_i$ may include general purpose and specialized register files and execution units configured to perform logic, arithmetic, and any other type of data processing functions. The processing cores $110_1$, $110_2$, $110_3$ and $110_4$, which are collectively referred to as processing cores 110, may be configured to perform identical functions, or may alternatively be configured to perform different functions adapted to different applications. Processing cores 110 may be single-threaded or multi-threaded, i.e., capable of executing multiple sequences of program instructions in parallel.

Each core $105_i$ is shown as including a level-1 (L1) cache. In other embodiments, each core $110_i$ may include more levels of cache, e.g., level 2, level 3, etc. Each cache $115_i$ may include instructions and/or data. Each cache $115_i$ is typically organized to include a multitude of cache lines, with each line adapted to store a copy of the data corresponding with one or more virtual or physical memory addresses. Each cache line also stores additional information used to manage that cache line. Such additional information includes, for example, tag information used to identify the main memory address associated with the cache line, and cache coherency information used to synchronize the data in the cache line with other caches and or with the main system memory. The cache tag may be formed from all or a portion of the memory address associated with the cache line.

Each L1 cache $115_i$ is coupled to its associated processing core $110_i$ via a bus $125_i$. Each bus $125_i$ includes a multitude of signal lines for carrying data and/or instructions. Each core $105_i$ is also shown as including a cache control logic $120_i$ to facilitate data transfer to and from its associated cache $115_i$. Each cache $115_i$ may be fully associative, set associative with two or more ways, or direct mapped. For clarity, each cache $115_i$ is shown as a single cache memory for storing data and instructions required by core $105_i$. Although not shown, it is understood that each core $105_i$ may include an L1 cache for storing data, and an L1 cache for storing instructions.

Each cache $115_i$ is partitioned into a number of cache lines, with each cache line corresponding to a range of adjacent locations in shared system memory 300. In one embodiment, each line of each cache, for example cache $115_1$, includes data to facilitate coherency between, e.g., cache $115_1$, main memory 300 and any other caches $115_2$, $115_3$, $115_4$, intended to remain coherent with cache $115_1$, as described further below. For example, in accordance with the MESI cache coherency protocol, each cache line is marked as being modified "M", exclusive "E", Shared "S", or Invalid "I", as is well known. Other cache coherency protocols, such as MSI, MOSI, and MOESI coherency protocols, are also supported by the embodiments of the present invention.

Each core $105_i$ is coupled to a cache coherency manager 200 via an associated bus $135_i$. Cache coherency manager 200 facilitates transfer of instructions and/or data between cores $105_i$, system memory 300, I/O units 310, 320 and optional shared L2 cache 305. Cache coherency manager 200 establishes the global ordering of requests, sends intervention requests, collects the responses to such requests, and sends the requested data back to the requesting core. Cache coherency manager 200 orders the requests so as to optimize memory accesses, load balance the requests, give priority to one or more cores over the other cores, and/or give priority to one or more types of requests over the others. Referring to FIGS. 2A and 2B, in one embodiment, an L1 cache $115_i$ includes a first cache tag array 150 used for regular traffic, and a second cache tag array 155 used for intervention traffic. In another embodiment, shown in FIG. 2C, one or more of the L1 caches include a single cache tag array 160 used for both regular and intervention coherent traffic. Although not shown, in some embodiments, one or more of cores $105_i$ include a Level-2 (L2) cache.

Figure 3:
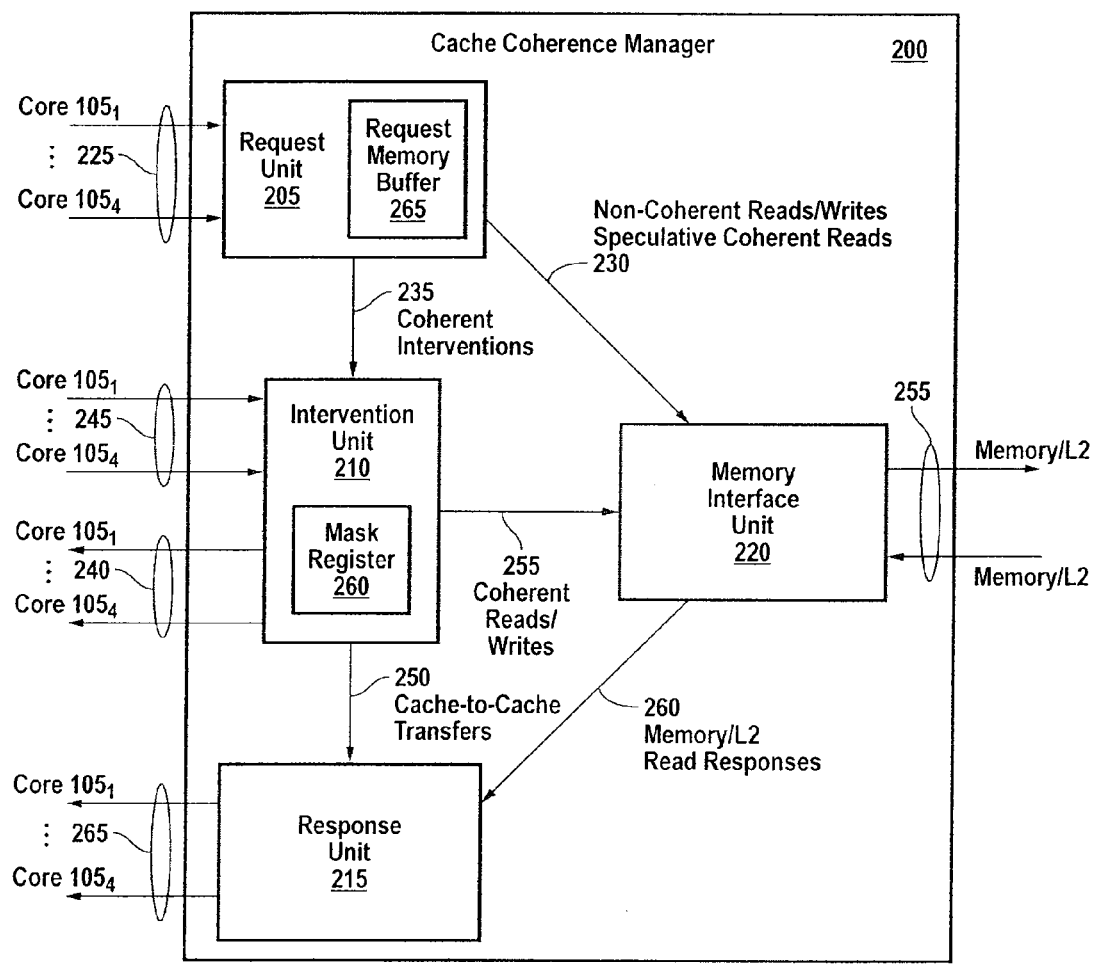
FIG. 3 shows various blocks of the coherency manger disposed in the microprocessor of FIG. 2.

FIG. 3 is a block diagram of cache coherency manager 200, in accordance with one embodiment of the present invention. Cache coherency manager 200 is shown as including, in part, a request unit 205, an intervention unit 210, a response unit 215, and a memory interface unit 220. Request unit 205 includes input ports 225 adapted to receive, for example, read requests, write requests, write-back requests and any other cache memory related requests from cores $105_i$. Request unit 205 serializes the requests it receives from cores $105_i$ and sends non-coherent read/write requests, speculative coherent read requests, as well as explicit and implicit writeback requests of modified cache data to memory interface unit 220 via port 230. Request unit 205 sends coherent requests to intervention unit 210 via port 235. In order to avoid a read after write hazard, the read address is compared against pending coherent requests that can generate write operations. If a match is detected as a result of this comparison, the read request is not started speculatively.

In response to the coherent intervention requests received from request unit 205, intervention unit 210 compares an identifier associated with the core originating the request to the data stored in mask register 260 to determine which one of the cores receive the request. Mask register 260 thus identifies cores that are to remain coherent with one another. Consequently cores that are not identified by mask register 260 as being coherent will remain non-coherent with one another. The request for the data access forwarded by request unit 205 is issued as an intervention message via output ports 240 to those cores that are to remain coherent with the requesting core in accordance with the data stored in mask register 260. If the data requested by a core is stored in the cache memory of any core that receives the intervention message, this data is returned to the intervention unit via input ports 245. In another embodiment, the requested data is returned to the intervention unit 210 only when the data is stored in a cache line that has either an exclusive or a modified state. Intervention unit 210 subsequently forwards this data to response unit 205 via output ports 250. Response unit 215 forwards this data to the requesting (originating the request) core via output ports 265. If the requested data is not found in the cache memory of any of the cores that receive the intervention message and the read request was not performed speculatively, intervention unit 210 requests access to this data by sending a coherent read or write request to memory interface unit 220 via output ports 255. A read request may proceed without speculation when, for example, a request memory buffer 265 disposed in request unit 205 and adapted to store and transfer the requests to memory interface unit 220 is full.

Memory interface unit 220 receives non-coherent read/write requests from request unit 205, as well as coherent read/write requests and writeback requests from intervention unit 210. In response, memory interface unit 220 accesses system memory 300 and/or higher level cache memories such as L2 cache 305 via input/output ports 255 to complete these requests. The data retrieved from memory 300 and/or higher level cache memories in response to such memory requests is forwarded to response unit 215 via output port 260. The response unit 215 returns the data requested by the requesting core via output ports 265. As is understood, the requested data may have been retrieved from an L1 cache of another core, from system memory 300, or from optional higher level cache memories.

In accordance with one embodiment of the present invention a multitude of coherent domains are established and maintained in processor 100. In one exemplary embodiment, the various cores disposed in processor 100 are partitioned to support two cache coherent domains. For example, cores $105_1$ and $105_2$ may form a first coherent domain 150, and cores $105_3$ and $105_4$ may form a second coherent domain 160. Because cores $105_1$ and $105_2$ are disposed in the same domain 150, their L1 caches $115_1$ and $115_2$ are maintained coherent with one another. Similarly, because cores $105_3$ and $105_4$ are disposed in the same coherent domain 160, their L1 caches $115_3$ and $115_4$ are maintained coherent with one another. However, neither of the L1 caches $115_1$ and $115_2$ is coherent with either L1 cache $115_3$ or L1 cache $115_4$.

To maintain coherency between the L1 caches disposed in the same coherent domain, a coherent request received from any of the cores is forwarded only to the cores that are in the same coherent domain as the requesting core. For example, a request from, e.g., core $105_1$ is sent as an intervention message only to cores $105_1$ and $105_2$. Similarly, a request from, e.g., core $105_4$ is sent as an intervention message only to cores $105_3$ and $105_4$. To achieve this, as described above, in one embodiment, a mask register 260 disposed in intervention unit 210 stores data defining the coherency relationship between various cores. For example, to maintain cores $105_1$ and $105_2$ coherent with one another, mask register 260 includes data that causes requests from $105_1$ and $105_2$ to be sent as intervention messages only to cores $105_1$ and $105_2$. Similarly, to maintain cores $105_3$ and $105_4$ coherent with one another, mask register 260 includes data that causes requests from $105_3$ and $105_4$ to be sent as intervention messages only to cores $105_3$ and $105_4$.

Coherent requests issued by any of the cores disposed in processor 100 are thus received by mask register 260 before any intervention message is sent by intervention unit 210. The coherent requests include information identifying the requesting core and are compared to the data stored in mask register 260. Using the example above, if mask register 260 identifies the requesting core as residing, for example, in coherent domain 150, an intervention message is sent only to cores $105_1$ and $105_2$ via output ports 245. One the other hand, if mask register 260 identifies the requesting core as residing, for example, in coherent domain 160, an intervention message is sent only to cores $105_3$ and $105_4$ via output ports 245. Mask register 260, in accordance with one embodiment of the present invention, enables a user to define the coherency relationship among various cores in any manner desired by the user.

The core that has the requested data updates its cache state for the intervention and supplies the response. Assume, for example, that core $105_2$ of FIG. 2 requests a read access without any need to modify the requested data. In accordance with the data in mask register 260, an intervention message is sent to both cores $105_1$ and $105_2$ via output ports 240. Assume further that the requested data is stored in L1 cache $115_1$ in an exclusive state. Accordingly, when core $105_1$ supplies the requested data, it also updates the cache state of the supplied cache line to shared from exclusive. Similarly, if the requested data is stored in L1 cache $115_1$ in, for example, a modified state, core $105_1$ updates the cache state of the requested line to shared and supplies this data to core $105_2$. As described above, the L1 cache that contains a copy of the requested data in a modified or exclusive state, will return this data to intervention unit 210 of cache coherent manager 200. This data is transferred to the requesting core via response unit 215 of cache coherent manager 200. In other embodiments, data stored in L1 cache $115_1$ is returned if the cache line containing this data does not have an invalid state.

In one embodiment, if there are multiple cores in the same coherent domain that have copies of the requested data in their respective L1 cache lines in a shared state, for optimization purposes, the requested data is supplied from the system memory. In one embodiment, if a coherent read request by a core in a coherent domain is a shared request and it is determined that no other core in that coherent domain includes a copy of the requested data, the shared state is upgraded to an exclusive state. The upgrade ensures that when another core in that coherent domain subsequently requests access to the same data, the requested data is supplied by the core which has a copy of that data in the exclusive state.

A coherent read request from any of the cores is forwarded to memory interface unit 220 for speculative read to memory 300. The speculative read assumes that the requested data will not be found in any of the cores coherent with the requesting core. If the requested data is found in response to the intervention message, the speculative read to memory 300 is canceled if it has not yet been issued by memory interface unit 220, or alternatively the response is dropped when it returns from system memory 300.

Referring to FIGS. 2A and 3, microprocessor 100 is also shown as including, in part, an I/O coherence unit 325 adapted to operate in coordination with coherence manager 200 so as to selectively provide coherency between I/O units 310, 320 and one or more of cores $105_1$, $105_2$, $105_3$ and $105_4$, in accordance with the data stored in mask register 260. For example, mask register 260 may be configured to establish coherency between I/O unit 310 and cores $105_1$, $105_2$, or between I/O unit 310 and cores $105_1$, $105_2$, $105_3$, and $105_4$, or any other combinations. Coherency between I/O unit 320 and one or more cores $105_1$, $105_2$, $105_3$, and $105_4$ may also be selectively established via the data stored in mask register 260. In FIG. 2A, I/O units 310, 320 are shown as being in communication with I/O coherence unit 325 via system bus 30. In other embodiments, I/O units 310, 320 communicate with I/O coherence unit 325 via a different bus (not shown).

For example, assume I/O unit 310 is to be maintained coherent with all four cores $105_1$, $105_2$, $105_3$ and $105_4$, and I/O unit 320 is to be maintained coherent with cores $105_1$ and $105_3$. Accordingly, mask register 260 is configured with such data that causes any coherent read request for data from I/O unit 310 to be forwarded as an intervention message to all four caches $115_1$, $115_2$, $115_3$ and $115_4$. Similarly, if for example, I/O unit 310 issues a coherent write request, any stale data residing in any of caches $115_1$, $115_2$, $115_3$ and $115_4$ is invalidated in accordance with the data in mask register 260. Similarly, mask register 260 is configured with such data that causes any coherent read request for data from I/O unit 320 to be forwarded as an intervention message to caches $105_1$ and $105_3$.

Consequently, as described above in accordance with one embodiment of the present invention, mask register 260 may be configured to achieve coherency between I/O unit 310 and, for example, cores $105_1$, $105_2$, $105_3$ and $105_4$, concurrently while (i) I/O unit 320 is maintained coherent with, for example, cores $105_2$, $105_4$, (ii) cores $105_1$ and $105_2$ are maintained coherent with one another, and (iii) cores $105_3$ and $105_4$ are maintained coherent with one another, and (iv) cores $105_1$, $105_2$ are maintained non-coherent with cores $105_3$, $105_4$. Mask register 260 contains data that identifies for each core or each I/O device where the intervention messages can come from, or to which cores the intervention messages will be sent. Mask register 260 thus enables a user to define independently and selectively the coherency relationships between the various processing cores, I/O units, etc., of a data processing system. In some embodiment, data that defines the coherency relationships among various cores is stored in a random access memory (RAM), disposed, for example, in the coherency manager. In yet other embodiments, hardwired circuitry may be used to supply this data.

Figure 4:
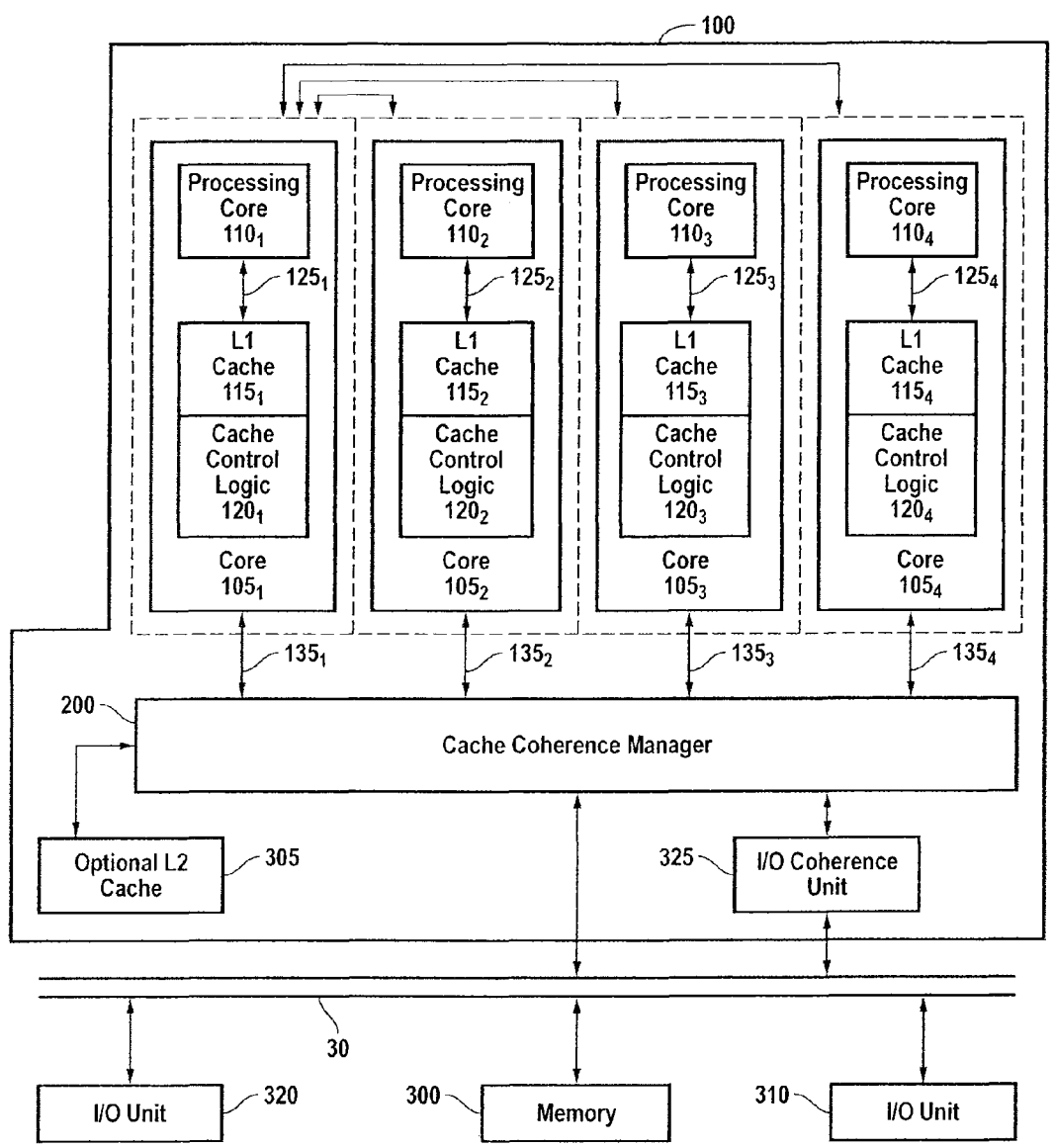
FIG. 4 shows a microprocessor, in communication with a number of I/Os and a system memory, and having a multitude of cores that are selectively maintained coherent or non-coherent with one another, in accordance with another embodiment of the present invention.

FIG. 4 shows the cores in microprocessor 100 being partitioned into three coherent domains in accordance with which core $105_1$ is coherent with each of cores $105_2$, $105_3$ and $105_4$, while cores $105_2$, $105_3$ and $105_4$ are maintained non-coherent with respect to one another. This partitioning of coherent domains may be used when core $105_1$ is configured as a master core dedicated to control plane functions, whereas cores $105_2$, $105_3$, and $105_4$ are configured as slave cores dedicated to data plane functions. Each slave core in the data plane is independent and is operating on a different set of data. Therefore, the slave cores do not need to be cache coherent with one another. Master core $105_1$ is however configured to supervise and control the activities of the slave cores $105_2$, $105_3$, and $105_4$. Accordingly, master core $105_1$ is maintained cache coherent with slave cores $105_2$, $105_3$, and $105_4$ in accordance with the data loaded in mask register 260. I/O unit 310 is assumed to be maintained coherent with all four cores $105_1$, $105_2$, $105_3$ and $105_4$, and I/O unit 320 is assumed to be maintained coherent with cores $105_1$ and $105_3$.

Figure 5:
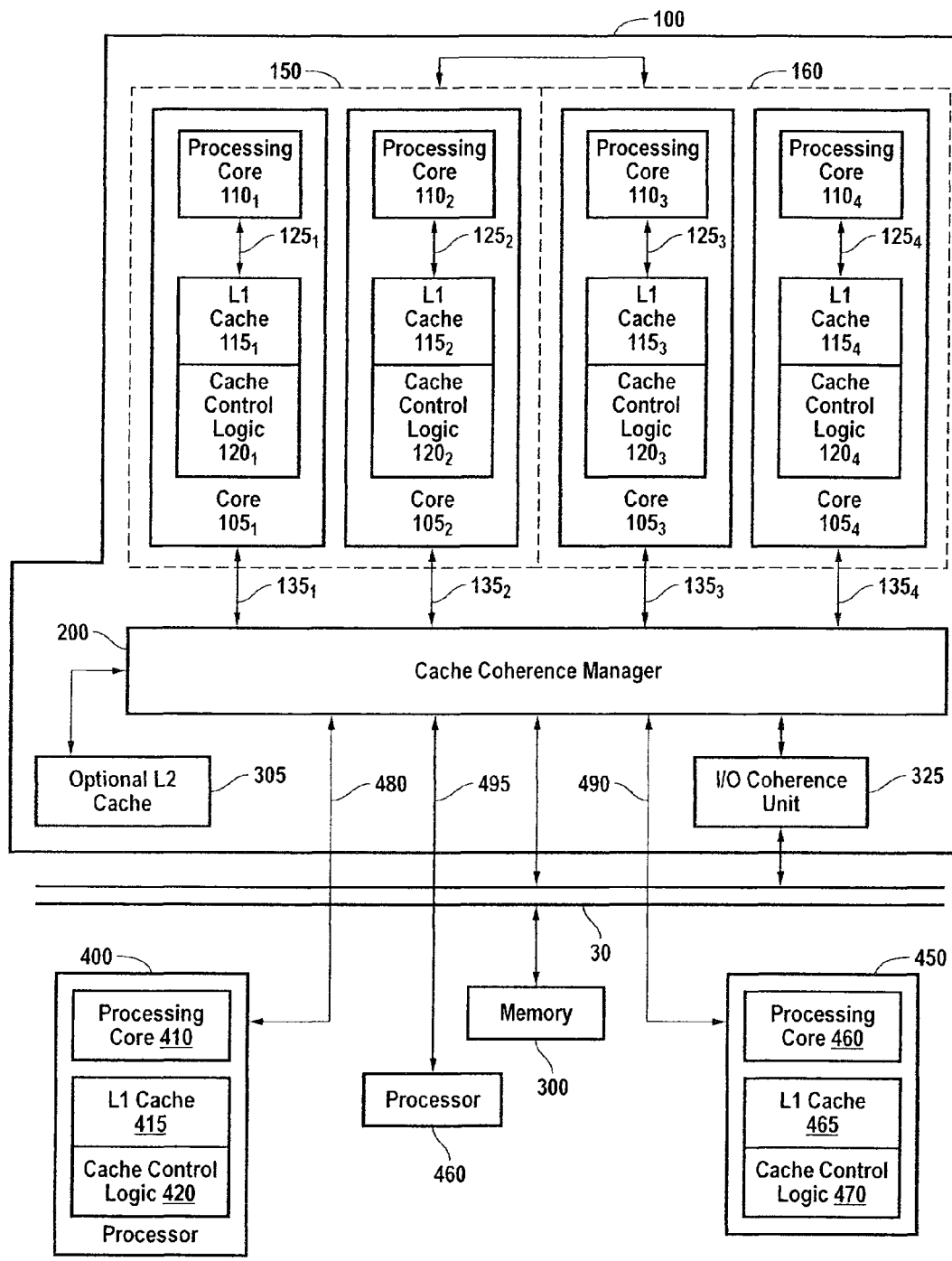
FIG. 5 shows a microprocessor having a multitude of cores that are selectively maintained coherent or non-coherent with one another and with other microprocessors, in accordance with another embodiment of the present invention.

A multi-core processor that includes a cache coherency manager, such as processor 100, may be used with other processors that do not have the logic required to maintain cache coherency. FIG. 5 is block diagram of a system that includes processor 100 (FIG. 2), system memory 300, and processors 400, 450, and 460.

Processor 400 includes, in part, an L1 cache 415 and a cache control logic 420. Processor 400 maintains direct communication with coherency manager 200 using ports 480. Processor 400 is assumed not to include a cache coherency manager or an intervention port. Therefore, L1 cache 415 of processor 400 cannot be maintained coherent with any of the L1 caches $115_1$, $115_2$, $115_3$ and $105_4$. Assume processor 400 is to remain fully non-coherent with cores $105_1$, $105_2$, $105_3$ and $105_4$. Accordingly, if the data requested by processor 400 is not present in its associated L1 cache 415, processor 400 looks up for this data in optional L2 cache 305 or system memory 300. Because processor 400 is fully non-coherent with cores $105_1$, $105_2$, $105_3$ and $105_4$, it does not look-up for the requested data in any of caches $115_1$, $115_2$, $115_3$ and $105_4$.

Processor 450 includes L1 cache 465 and cache control logic 470. Processor 450 maintains direct communication with coherency manager 200 using ports 490. Processor 450 is also assumed not to include a cache coherency manager or an intervention port. Therefore, L1 cache 465 of processor 450 cannot be maintained coherent with any of the L1 caches $115_1$, $115_2$, $115_3$ and $105_4$. Assume, for example, that processor 450 is to be kept partially coherent with cores $105_1$ and $105_2$, as defined by mask register 260. A processor with a cache memory that does not include an intervention port and/or a cache coherency manager is defined as being partially non-coherent with other cores if the processor is configured to first look-up for the requested data in the cache memories disposed in the other cores before accessing the system memory or the L2 cache. Therefore, if for example, the data requested by processor 450 is not present in its associated L1 cache 465, its read request is caused to be sent as an intervention message to cores $105_1$ and $105_2$ in accordance with the data stored in mask register 260. If none of these cores have a copy of the requested data, L2 cache 305 or system memory 300 are accessed to obtain this data. Similarly, when processor 450 requests, for example, a write operation, any stale copies of this data present in cores $105_1$ and $105_2$ must be invalidated.

Processor 460 does not include an L1 cache and maintains direct communication with coherency manager 200 using ports 495. Because processor 460 is assumed not to include a cache memory, it can remain fully coherent with cache memories $105_1$, $105_2$, $105_2$, and $105_4$. For example, processor 460 receives the latest copy of the requested data in response to a read request. Likewise, when processor 460 issues a write request, any stale data residing in any of the cache memories $105_1$, $105_2$, $105_2$, and $105_4$ gets invalidated.

Figures 6, 7:
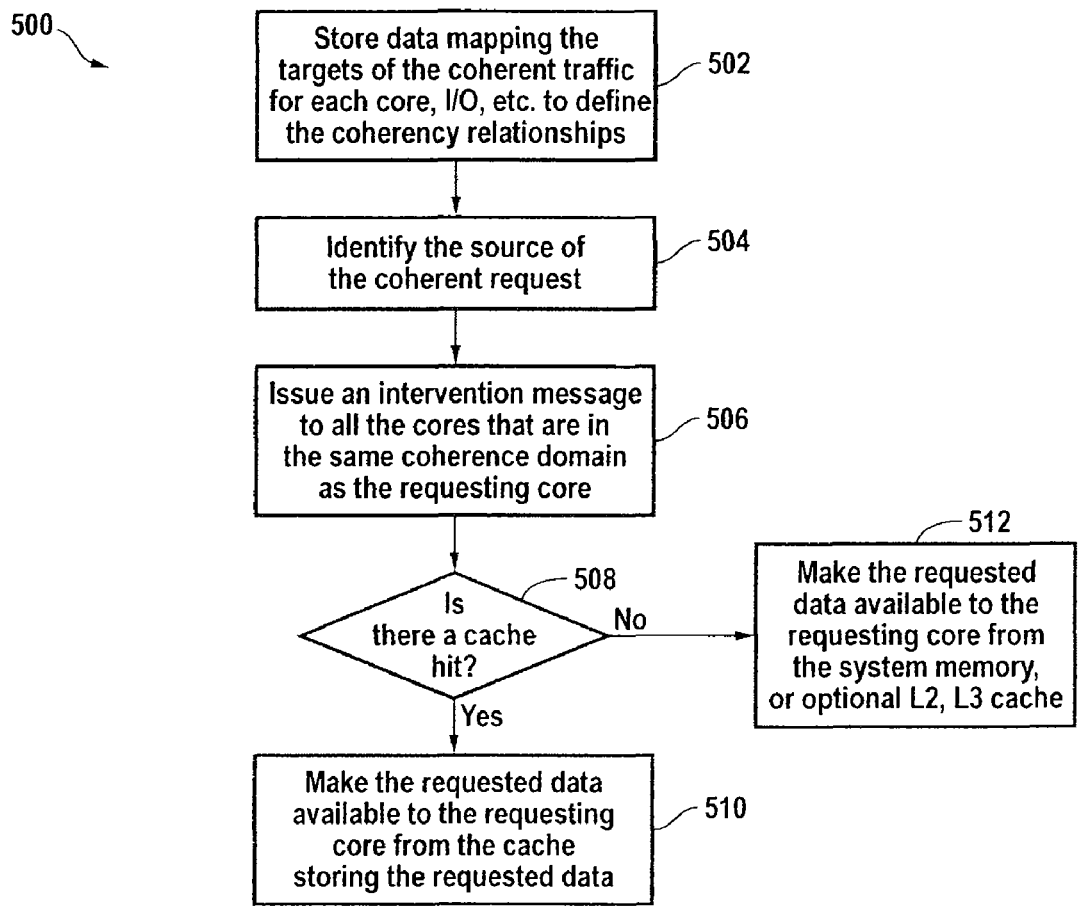
FIG. 6 is a flowchart of steps carried out to maintain a multitude of coherent domains, in accordance with one embodiment of the present invention.
FIG. 7 shows an exemplary data stored in a mask register configured to establish the multitude of coherence domains associated with FIG. 4.

FIG. 6 is a flowchart 500 of steps carried out to establish and maintain a multitude of coherence domains, in accordance with one exemplary embodiment of the present invention. To achieve this, a number of entries mapping the target(s) of each coherent request to the source of the coherent request is stored 502; the mapping defines the various coherence relationships. To maintain the coherence domains, when a coherent request is received, the source of the request is identified 504. In response, an intervention message is sent 506 to each core that has been defined as being in the same coherent domain as the requesting core, in accordance with the stored entries. Next, the requested data is looked up 508 in the cache memories of the cores that receive the intervention message. If a cache hit occurs 510, depending on the request type and the coherency state of the data, access to the requested data is made available to the requesting core from the cache that caused the cache hit signal to be generated. If a cache miss occurs, access to the requested data is made available to the requesting core 512 via the system memory or the optional L-2 or L-3 cache.

FIG. 7 shows an exemplary data stored in mask register 260 configured to establish the multitude of coherence domains described above with reference to FIG. 4. A request issued by core $105_1$ results in selection of entry number 1, i.e., "000", which, in turn, causes an intervention message to be sent to all cores $105_1$, $105_2$, $105_3$ and $105_4$, in accordance with the mask value "001111" associated with this entry. A request issued by core $105_2$ results in selection of entry number 2, i.e., "001", which, in turn, causes an intervention message to be sent to cores $105_1$ and $105_2$, in accordance with the mask value "000011" associated with this entry. A request issued by core $105_3$ results in selection of entry number 3, i.e., "010", which, in turn, causes an intervention message to be sent to cores $105_1$ and $105_3$, in accordance with the mask value "000101" associated with this entry. A request issued by core $105_4$ results in selection of entry number 4, "011", which, in turn, causes an intervention message to be sent to cores $105_1$, and $105_3$ and $105_4$, in accordance with the mask value "001101" associated with this entry. A request issued by I/O unit 310 results in selection of entry number 5, i.e., "100", which, in turn, causes an intervention message to be sent to all cores $105_1$, $105_2$, $105_3$ and $105_4$, in accordance with the mask value "001111" associated with this entry. A request issued by I/O unit 320 results in selection of entry number 1, i.e., "101", which, in turn, causes an intervention message to be sent to cores $105_1$ and $105_3$, in accordance with the mask value "000101" associated with this entry.

A number of advantages are gained by defining multiple coherency domains and ensuring that coherency is maintained only among devices, e.g., cores, I/Os, etc., that can benefit from their coherency. To the extent that the number of cache lookups is reduced and fewer responses are invoked, performance gains are achieved and power consumption is reduced. The reduction in cache lookups may also dispense the need for having duplicate tag arrays for each cache, where one such array is used for regular cache traffic and another for intervention traffic. The reduction in coherence traffic, due to the establishment of multiple coherence domains may minimize the coherent traffic to the point where any benefit in including a second cache tag array to accommodate coherent traffic is outweighed by the resulting increase in the size of the cache. In other words, since coherency is maintained only between devices that so require, the number of intervention messages are reduced, thereby possibly obviating the need for a duplicate tag array within each cache. The semiconductor die on which the processor of the present invention is formed may thus have a smaller size.

Figure 8:
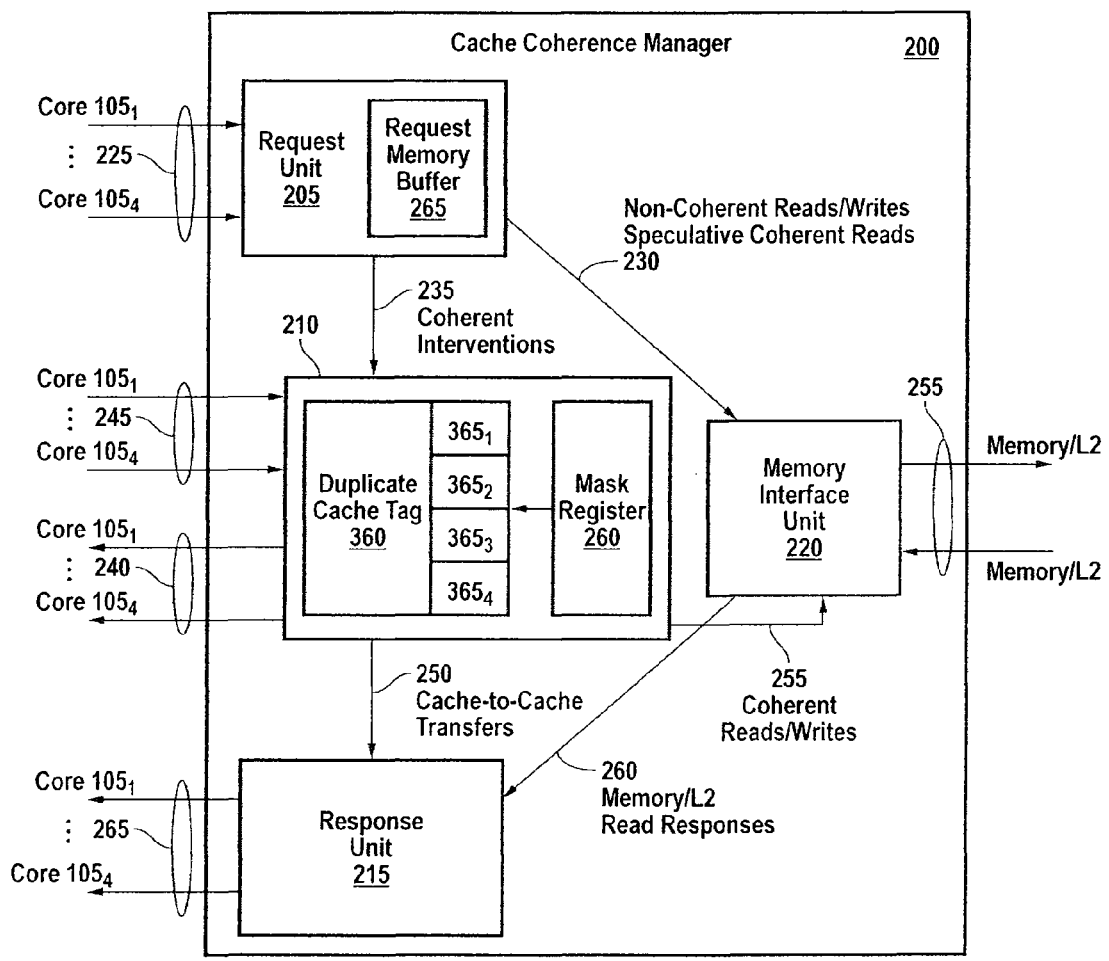
FIG. 8 shows various blocks of the coherency manger disposed in the microprocessor of FIG. 2, in accordance with another embodiment of the present invention.

FIG. 8 is a block diagram of cache coherency manager 200, in accordance with another embodiment of the present invention. The embodiment of the cache coherency manager shown in FIG. 8 uses an L1 cache tag array 360 to maintain the coherence domains. L1 cache tag array 360 is a duplicate of the aggregate L1 cache tags stored in the cores and may be logically partitioned into four tag arrays $365_1$, $365_2$, $365_3$, and $365_4$ associated respectively with L1 caches $115_1$, $115_2$, $115_3$, and $115_4$. An identifier associated with the core originating the request is compared with the indices stored in mask register 260 to determine the L1 tag array partitions $365_i$ that will be subsequently searched to identify, in turn, the core $105_i$ that will receive a corresponding intervention message. In other words, a hit resulting from a search in L1 cache tag array 360 identifies which, if any, of the cores contains the requested data and will cause an intervention message to be sent only to that core. L1 cache tag array 360 eliminates the need for having a dedicated duplicate cache tag within each core.

Figure 9:
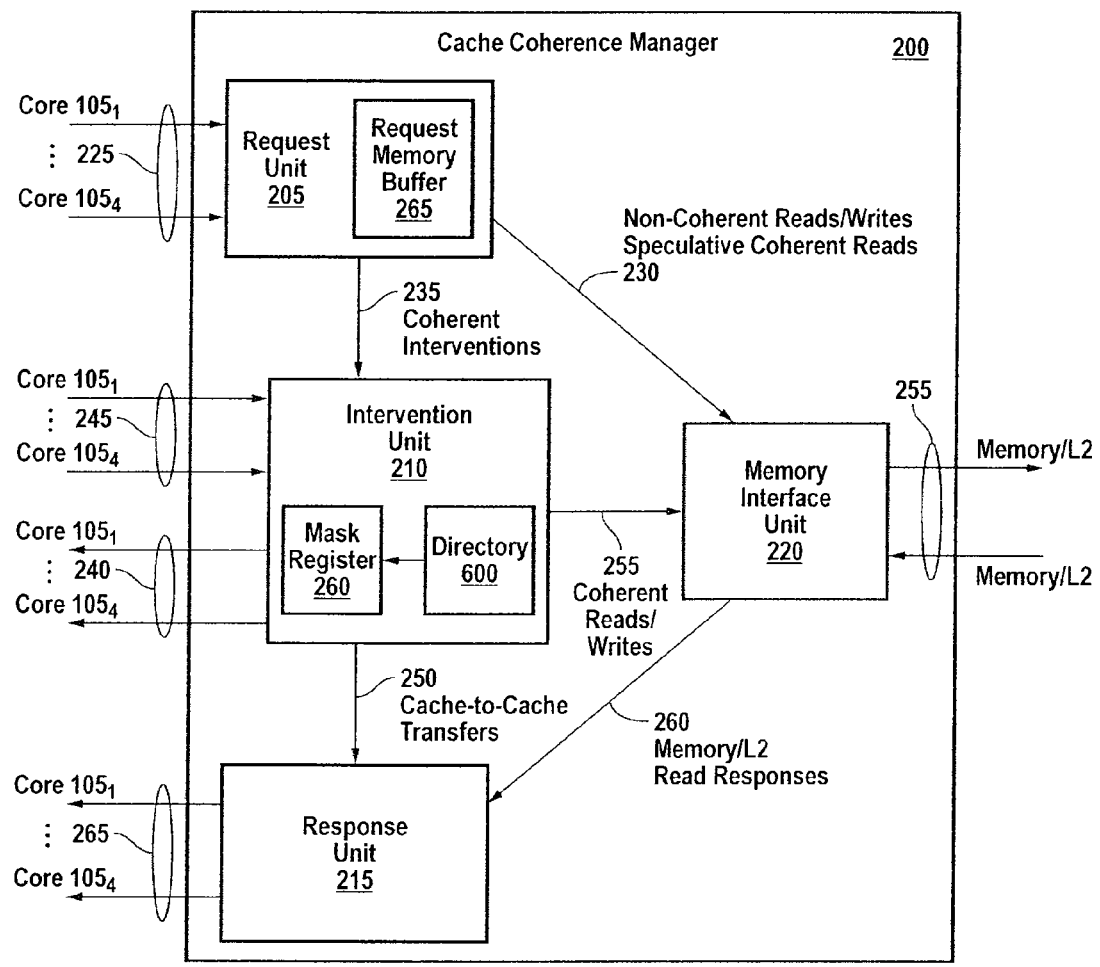
FIG. 9 shows various blocks of the coherency manger disposed in the microprocessor of FIG. 2, in accordance with another embodiment of the present invention.

FIG. 9 is a block diagram of a cache coherency manager 200, in accordance with another embodiment of the present invention. The embodiment of the cache coherency manager shown in FIG. 9 uses a directory 600 to maintain the coherence domains. Directory 600 together with mask register 260 are adapted to direct the intervention messages in conformity with the established coherence relationships and based on the address of the request. For each coherent request, directory 600 identifies one or more cores that may be the targets of that request and supplies this information to mask register 260. Mask register 260, in response and in accordance with this information, uses the mask values stored therein to cause an intervention message to be forwarded to a core likely to contain the requested data. The core receiving the intervention messages will search for this data in its respective L1 cache.

Directory 600 is updated according to rules that enable directory 600 to identify coherent data that is not stored in any of the caches. However, data that is identified by directory 600 as being stored in an L1 cache, may not actually be present in that cache. Data identified by directory 600 as being stored in a cache and that is subsequently detected as being present in that cache, is treated as valid if the cache line in which that data is stored does not have an invalid state. Directory 600 uses an addressing scheme to determine the targets of the intervention messages.

In some embodiments, main memory 300 is logically partitioned in conformity with the multiple coherence domains defined by the cache coherency manager. Each coherence domain is thus mapped to and is associated with a range of addresses within memory 300. The address associated with a request is used to identify the main memory partition that is searched to access the requested data.

Figure 10:
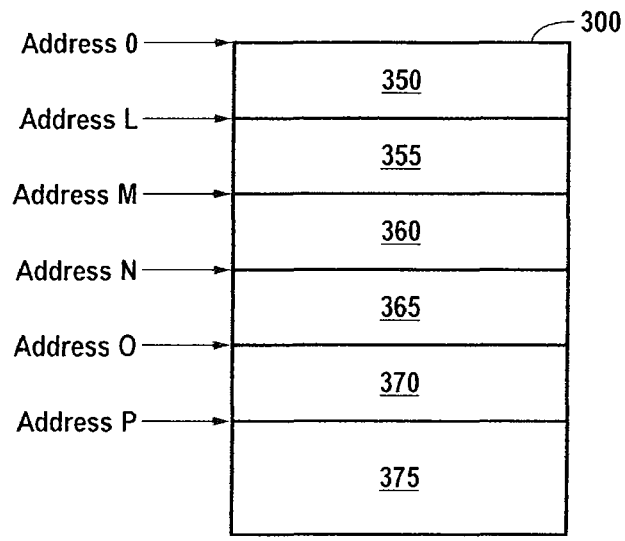
FIG. 10 shows a main memory with an addressable storage space that is partitioned to support a multitude of coherence domain, in accordance with one embodiment of the present invention.

For example, referring to FIG. 4, assume memory 300 is partitioned to support coherency between core $105_1$, and each of cores $105_2$, $105_3$ and $105_4$, as well as non-coherency between cores $105_2$, $105_3$ and $105_4$. FIG. 10 is an example of such a partitioning of memory 300. Partition 350 covering the range of addresses between 0 and L, is shown as being dedicated to storing copies of data that maintain coherency between cores $105_1$ and $105_2$. Partition 355, covering the range of addresses between L+1 and M, is shown as being dedicated to storing copies of data that maintain coherency between cores $105_1$ and $105_3$. Partition 360, covering the range of addresses between M+1 and N, is shown as being dedicated to storing copies of data adapted that maintain coherency between cores $105_1$ and $105_4$. Partition 365, covering the range of addresses between N+1 and O, is shown as being dedicated to storing copies of data adapted that maintain coherency across all cores $105_1$, $105_2$, $105_3$ and $105_4$. Partition 370, covering the range of addresses between O+1 and P, is shown as being dedicated to storing copies of data only used by core $105_1$. Partition 375, covering the range of addresses greater than P+1, is shown as being dedicated to storing non-cacheable data. In some embodiments, the logical partitioning of main memory 300 and the mapping between each coherence domain and the associated memory 300 partition is handled by intervention unit 210 disposed in cache coherency manager 200. As described above, in one embodiment, the address associated with a request is used to provide the required mapping and access the corresponding memory partition. In another embodiment, an identifier associated with a core issuing the request is used to provide the required mapping and access the corresponding memory partition. In yet other embodiments, a combination of the request address and an identifier associated with the core issuing the request are used to provide the required mapping and access the corresponding memory partition.

Figure 11:
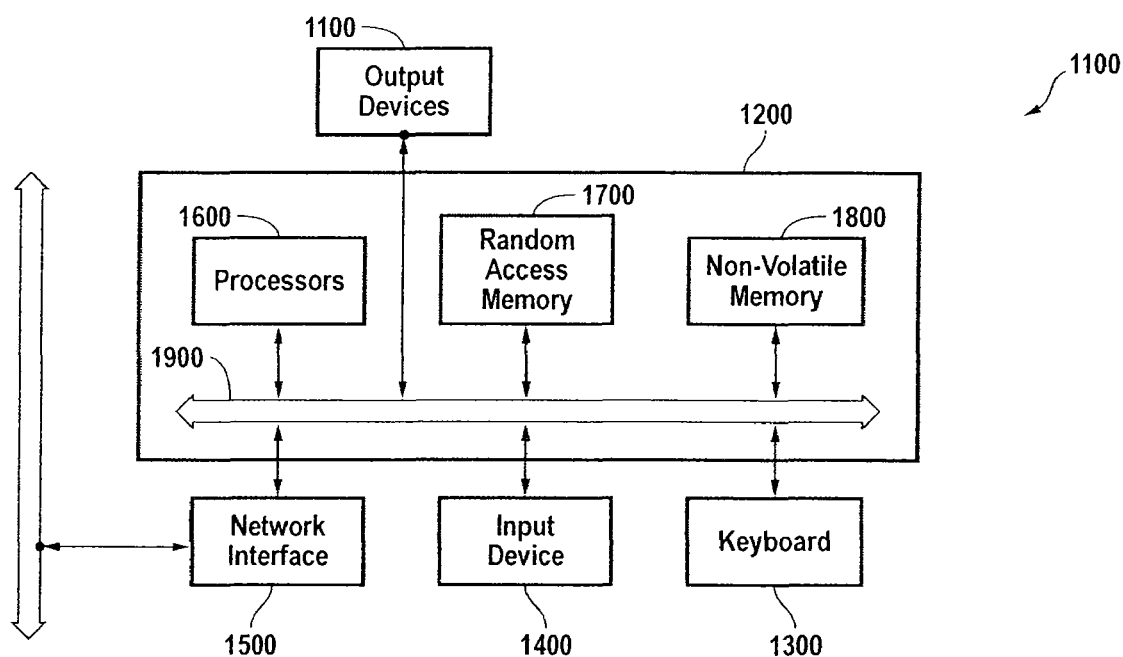
FIG. 11 shows an exemplary computer system using an embodiment of the present invention.

FIG. 11 illustrates an exemplary computer system 1000 in which the present invention may be embodied. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 may be a multi-processor system such as multi-processor 100 described above.

RAM 1700 and non-volatile memory 1800 are examples of tangible media for storage of data, audio/video files, computer programs, applet interpreters or compilers, virtual machines, and embodiments of the present invention described above. For example, the above described embodiments of the processors of the present invention may be represented as human-readable or computer-usable programs and data files that enable the design, description, modeling, simulation, testing, integration, and/or fabrication of integrated circuits and/or computer systems. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Although the above embodiments of the present invention are made with reference to a processor having four cores, it is understood that the processor may have more or fewer than four cores. The arrangement and the number of the various devices shown in the block diagrams are for clarity and ease of understanding. It is understood that combinations of blocks, additions of new blocks, re-arrangement of blocks, and the like fall within alternative embodiments of the present invention. For example, any number of I/Os, coherent multi-core processors, system memories, L2 and L3 caches, and non-coherent cached or cacheless processing cores may also be used in a single system and partitioned in accordance with a mask register to form a multitude of coherent and non-coherent domains. Moreover, although the present invention is described with reference to using a mask register to define the various coherency domains, it is understood that any other storage mediums, such as a RAM, and any other technique, such as a look-up tables, etc. may be used to establish the coherency domains and provide the mapping between the originator of the coherent request and the targets of the resulting intervention messages, in accordance with the present invention.

It is understood that the apparatus and methods described herein may be included in a semiconductor intellectual property core, such as a microprocessor core (e.g. expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, BICMOS, or otherwise, that may be used to manufacture the various embodiments of the present invention. Other additions, subtractions or modifications are obvious in view of the present invention and are intended to fall within the scope of the appended claims.

What is claimed is:

1. A microprocessor comprising:
    a plurality of processing cores; and
    a cache coherency manager adapted to define a plurality of coherency relationships among the plurality of processing cores so that traffic characterized as being associated with a coherency relationship flows only between processing cores defined as having the coherency relationship.

2. The microprocessor of claim 1 wherein in response to receiving a request from a first one of the plurality of processing cores, the cache coherency manager sends a message to a second one of the plurality of processing cores that is defined as having a coherency relationship with the first one of the plurality of processing cores.

3. The microprocessor of claim 2 wherein said plurality of coherency relationships are defined in accordance with data supplied from a group consisting of programmable register, random access memory and hardwired circuitry.

4. The microprocessor of claim 3 wherein said cache coherency manager further comprises logic circuits adapted to maintain a first input/output device coherent with the first and the second ones of the plurality of processing cores in accordance with the supplied data, said input/output device being coupled to the microprocessor via a system bus.

5. The microprocessor of claim 2 wherein said cache coherency manager further comprises logic circuits adapted to:
    transfer a data identified by the request to the first one of the plurality of processing cores from a cache memory associated with the second one of the plurality of processing cores if the request is a read access request and the data is stored in the cache memory associated with the second one of the plurality of processing cores.

6. The microprocessor of claim 5 wherein said cache coherency manager further comprises logic circuits adapted to:
    transfer the data to the first one of the plurality of cores from one of a level-2 cache and a system memory if the data is not stored in the cache memory associated with the second one of the plurality of cores.

7. The microprocessor of claim 2 wherein said cache coherency manager further comprises a logic block adapted to logically partition a main memory into a plurality of addressable regions each region being configured to store coherent data associated with a different one of the coherence relationships, said main memory being coupled to the microprocessor via a system bus.

8. The microprocessor of claim 2 wherein said cache coherency manager is configured to send the message to the second one of the plurality of processing cores in accordance with one of an identifier associated with the first one of the plurality of processing cores and an address defined by the request.

9. The microprocessor of claim 1 wherein at least one of the plurality of processing cores includes a single cache tag array.

10. A method of controlling coherent traffic among a plurality of processing cores disposed in a microprocessor, the method comprising:
    enabling flow of coherent traffic among a first plurality of processing cores that are defined as having a coherency relationship; and
    inhibiting flow of coherent traffic among a second plurality of processing cores that are defined as not having a coherency relationship.

11. The method of claim 10 further comprising:
    receiving a first request from a first processing core of the first plurality of processing cores; and
    sending a message to a second processing core of the first plurality of processing cores.

12. The method of claim 11 further comprising:
    transferring a data identified by the first request to the first processing core of the first plurality of processing cores from a cache memory associated with the second processing core of the first plurality of processing cores if the first request is a read request and the data is stored in the cache memory associated with the second processing core of the first plurality of processing cores.

13. The method of claim 11 further comprising:
maintaining coherency between a first input/output device and a the first plurality of processing cores, said input/output device being coupled to the microprocessor via a system bus.

14. The method of claim 13 further comprising:
maintaining cache coherency between the first plurality of processing cores and a third plurality of processing cores disposed in the microprocessor;
maintaining cache coherency between the first plurality of processing cores and a forth plurality of processing cores disposed in the microprocessor; and
maintaining cache non-coherency between the second plurality of processing cores and the third plurality of processing cores.

15. The method of claim 11 further comprising:
disposing a single cache tag array in at least one of the plurality of processing cores.

16. The method of claim 11 further comprising:
defining the coherency relationship in accordance with data supplied from a group consisting of programmable register, random access memory and hardwired circuit.

17. The method of claim 11 further comprising:
coupling a main memory to the microprocessor via a system bus; and
logically partitioning the main memory into a plurality of regions each adapted to store coherent data associated with a different one of a plurality of coherency relationships.

18. The method of claim 11 further comprising:
sending the message to the second processing core of the first plurality of processing cores in accordance with one of an identifier associated with the first processing core of the first plurality of processing cores and an address defined by the request.

19. A non-transitory computer readable storage medium including instructions defining logic blocks of a microprocessor comprising a plurality of processing cores, the computer readable storage medium adapted for use by an electronic design automation application executed by a computer, wherein the logic blocks are configured to perform an operation comprising:
enabling flow of coherent traffic among a first plurality of processing cores that are defined as having a coherency relationship; and
inhibiting flow of coherent traffic among a second plurality of processing cores that are defined as not having a coherency relationship.

20. The non-transitory computer readable storage medium of claim 19 wherein the logic blocks are further adapted to perform an operation comprising:
receiving a first request from a first processing core of the first plurality of processing cores; and
sending a message to a second processing core of the first plurality of processing cores.

21. The non-transitory computer readable storage medium of claim 20 wherein the logic blocks are further adapted to perform an operation comprising:
transferring a data identified by the first request to the first processing core of the first plurality of processing cores from a cache memory associated with the second processing core of the first plurality of processing cores if the first request is a read request and the data is stored in the cache memory associated with the second processing core of the first plurality of processing cores.

22. The non-transitory computer readable storage medium of claim 20 wherein the logic blocks are further adapted to perform an operation comprising:
maintaining coherency between a first input/output device and the first plurality of processing cores, said input/output device being coupled to the microprocessor via a system bus.

23. The non-transitory computer readable storage medium of claim 20 wherein the logic blocks are further adapted to perform an operation comprising:
logically partitioning a main memory into a plurality of regions each adapted to store coherent data associated with a different one of a plurality of coherency relationships.

24. The non-transitory computer readable storage medium of claim 20 wherein the logic blocks are further adapted to perform an operation comprising:
sending the message to the second processing core of the first plurality of processing cores in accordance with one of an identifier associated with the first processing core of the first plurality of processing cores and an address defined by the request.

25. The non-transitory computer readable storage medium of claim 19 wherein at least one of the first plurality of processing cores includes a single cache tag array.

* * * * *